Inventors
Joseph A. Anderson &
John L. Taylor

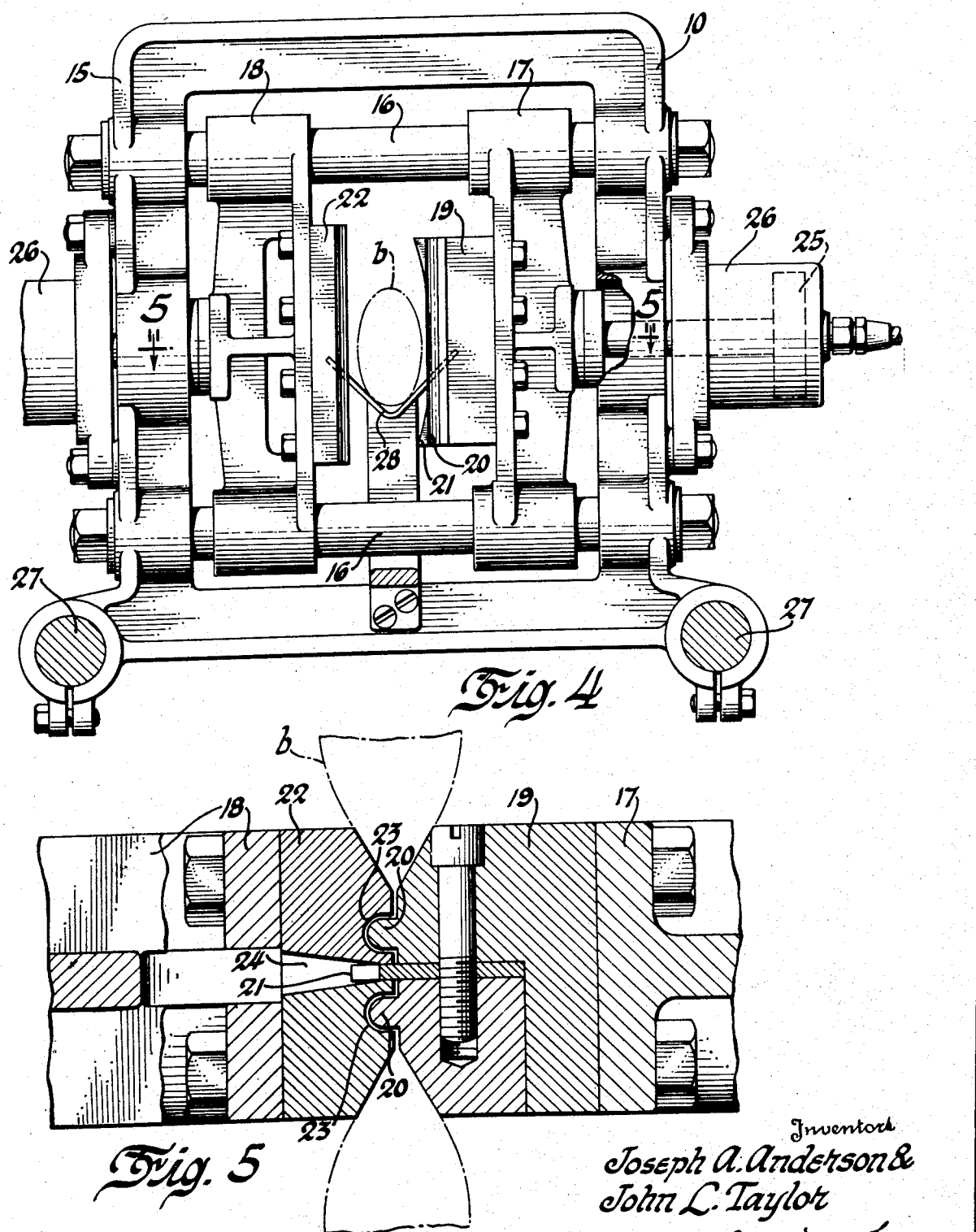

Patented Jan. 28, 1941

UNITED STATES PATENT OFFICE 2,230,154

FILTER ELEMENT AND PROCESS AND APPARATUS FOR MAKING IT

Joseph A. Anderson and John L. Taylor, Flint, Mich., assignors to General Motors Corporation, Detroit, Mich., a corporation of Delaware Application February 4, 1937, Serial No. 124,149

4 Claims. (Cl. 183—45)

In the Webb patent No. 2,224,172, dated December 10, 1940, there is disclosed an air cleaner filter element which consists of a length of a tubular body of indefinite length made by winding a group of flattened and deformed strands of copper wire upon themselves and a machine by which filter elements of this type may be made.

This invention has to do with filter elements of the type disclosed in the Webb patent above-identified and has for its object to provide a filter element of this type with ends so formed that it cannot unravel and a method and apparatus by which such filter elements may be produced from the tubular body of indefinite length formed by the machine disclosed in the Webb patent.

For a better understanding of the nature and objects of this invention, reference is made to the following specification and the accompanying drawings wherein the invention is disclosed.

In the accompanying drawings:

Figure 4 is a view, taken as indicated by the line 4—4 of Figure 1, of the shearing and crimping mechanism of the machine shown in Figure 1 with its jaws open.

Figure 5 is an enlarged fragmentary view, taken as indicated by the line 5—5 of Figure 4, of the shearing and crimping mechanism with its jaws closed.

Figure 1:
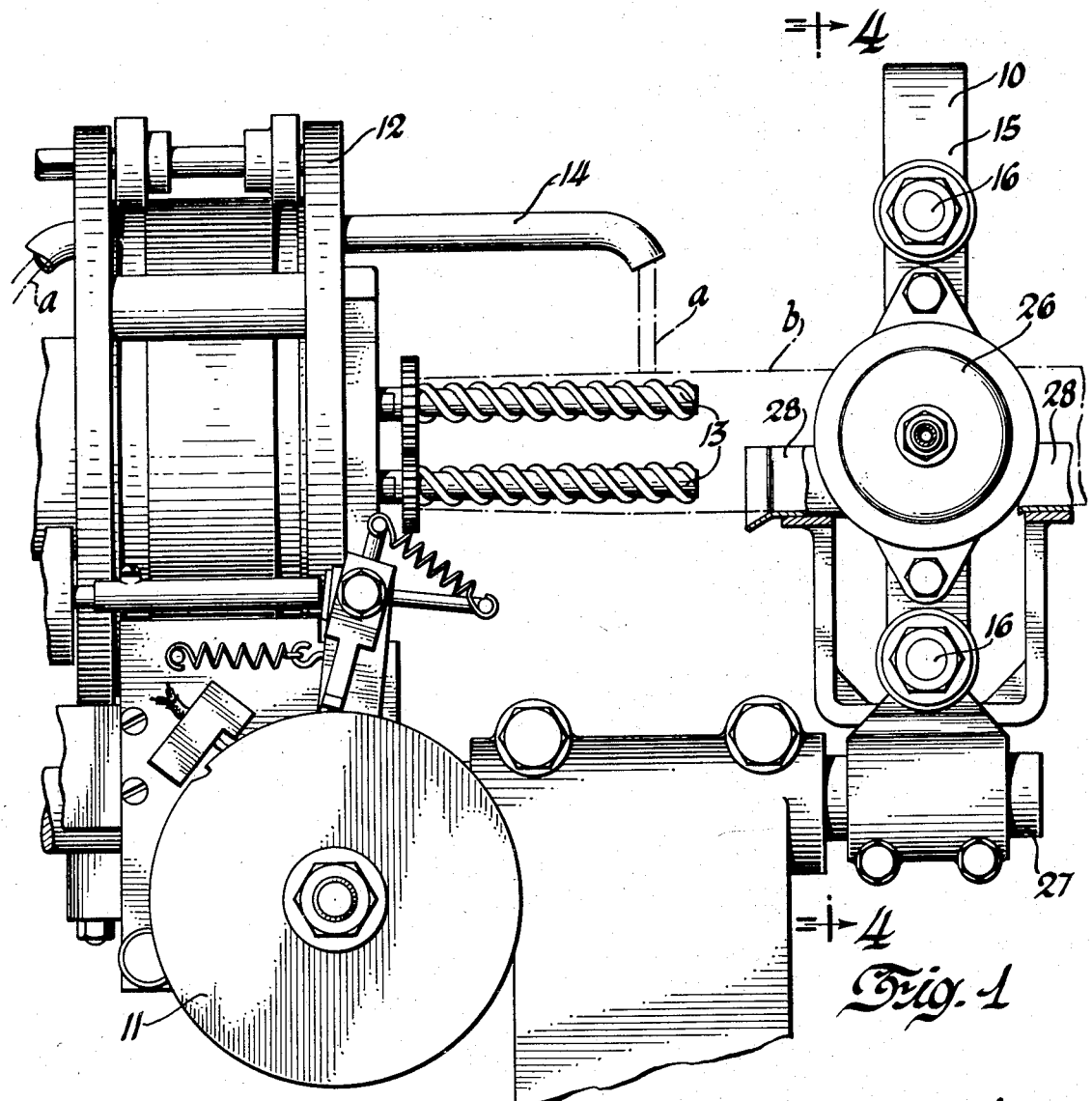
Figure 1 is a fragmentary side elevation of a machine by which filter elements in accordance with this invention may be made.

Except in the shearing and crimping mechanism, the machine which is shown fragmentarily in the drawings does not differ from that disclosed in the Webb patent above-identified and we have, therefore, felt it necessary to show in the drawings only the shearing and crimping mechanism 10, the timing mechanism 11 therefor and the winding mechanism 12, which is located next to the shearing and crimping mechanism. It will, however, be understood that the machine also includes mechanism for flattening and deforming strands of copper wire and feeding a group of them to the winding mechanism and mechanism for actuating the flattening and deforming, the winding and the timing mechanisms.

The winding mechanism consists essentially of two screw-shafts 13 which rotate about their respective axes but do not move bodily and a tube 14 of which the end shown in the drawings rotates around and moves back and forth lengthwise of the screw-shafts. The group of strands $a$ from the flattening and deforming mechanism is fed into the end of the tube 14 which is not shown in the drawings and is wound around and back and forth lengthwise of the screw-shafts 13 as it emerges from the end of the tube 14 which is shown in the drawings. The concurrent rotation of the screw-shafts about their respective axes constantly moves the tubular body thus formed toward and off the outer ends of the screw-shafts and, thus, the tubular body $b$ of indefinite length which has been referred to is formed.

The shearing and crimping mechanism 10 includes a generally rectangular frame 15 across which extends two parallel rods 16 which are secured in the frame. On the rods 16, there are mounted so that they may slide back and forth toward and away from each other jaws 17 and 18. To the jaw 17, there is secured a two-part block 19 on which there are formed two parallel ribs 20 and in which there is secured a curved-edge blade 21 which is disposed between and parallel to the ribs. To the jaw 18, there is secured a two-part block 22 in which there are formed grooves 23 into which the ribs 20 enter and between the grooves 23 a recess 24 into which the blade 21 enters when the jaws 17 and 18 are closed. To move the jaws 17 and 18 toward and away from each other, there is secured to each a piston 25 which fits snugly within a cylinder 26 which is secured to the frame 15.

Figure 2:
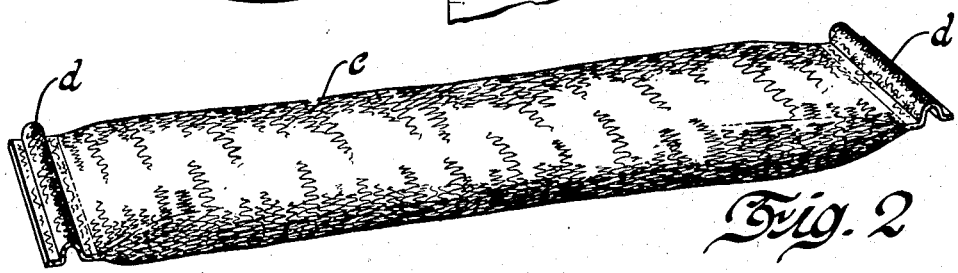
Figure 2 shows a filter element in accordance with this invention.

The shearing and crimping mechanism 10 is secured to the main frame 27 of the machine which is shown in the drawings opposite the outer ends of the screw-shafts 13 of the winding mechanism 12. As the tubular element $b$ is discharged from the screw-shafts 13, it passes through a trough 28 between the jaws 17 and 18 of the shearing and crimping mechanism 10. When a predetermined length of the tubular element $b$ has been discharged from the screw-shafts 13, the timing mechanism 11 actuates a valve which is not shown in the drawings and admits air to the cylinders 26 so that the jaws 17 and 18 are moved, successively, from their open position to their closed position and then back to their open position. During the course of this movement, the tubular element $b$ is first gripped between the block 22 and the ribs 20 on the block 19 and then severed as the blade 21 enters the recess 24. Then the severed ends of the tubular element are flattened and crimped as the ribs 20 enter the grooves 23. After this, as the jaws 17 and 18 move apart, the tubular element b is released by the shearing and crimping mechanism and again advanced between the jaws 17 and 18 as the winding operation continues. The operations which have been described are repeated as long as the machine which is shown in the drawings is operating and there are, consequently, produced by the operation of the machine sausage-like filter elements c like that shown in Figure 2 which are of uniform length with flattened ends with crimps d in them which prevent unraveling of the filter elements.

Figure 3:
Figure 3 is a fragmentary view of a filter element in accordance with this invention bent into ring-like form.

The filter elements c were designed for installation in air cleaners of the type shown in Figure 25 of the Webb patent above-identified in the same manner as the filter elements shown therein. Consequently, after they are formed the filter elements c are coated with oil or some other suitable liquid, and then bent into ring-like form with their flattened ends overlapping and one of the crimps d fitting into the other as shown in Figure 3. Flattening and crimping the ends of the filter elements c, therefore, not only prevents unraveling of the filter elements but also eliminates the possibility of spaces between the ends of the filter elements through which air may pass without being cleaned when the filter elements are employed in the manner we have described.

We claim:

1. In a filter element, strands of metal made into an elongated structure of loose texture which is intrinsically unravelable, the structure being compressed and flattened ends to prevent it unraveling and being of ring-like form with the compressed and flattened ends overlapped.

2. In a filter element, a group of strands of metal wound back and forth upon itself into an elongated structure of loose texture which is intrinsically unravelable, the structure having compressed and flattened and transversely crimped ends to prevent it unraveling and being of ring-like form with the compressed and flattened and transversely crimped ends overlapped with the crimps interfitting with each other.

3. In a fluid strainer of the character described, an elongated approximately cylindrical mass of loosely stranded material having ends which taper off to flattened portions, said flattened portions having transverse U-shaped folds in the same direction, which prevent the stranded material from unraveling and interlock to form an annular filter element.

4. A filter element comprising a roll-like unit of circumferentially and loosely wound strands extending in endless continuity between opposite ends thereof, said strands having their free ends compacted together in overlapping interlocking relation to prevent unraveling thereof.

JOHN L. TAYLOR.
JOSEPH A. ANDERSON.

CERTIFICATE OF CORRECTION.

Patent No. 2,230,154. January 28, 1941.

JOSEPH A. ANDERSON, ET AL.

It is hereby certified that error appears in the printed specification of the above numbered patent requiring correction as follows: Page 2, second column, line 2, claim 1, for the word "being" read --having--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.